(12) United States Patent
Landgraf

(10) Patent No.: US 8,855,792 B2
(45) Date of Patent: Oct. 7, 2014

(54) AUTOMATED CREATION AND ADAPTION OF A MACHINE OR SYSTEM MODEL

(75) Inventor: Guenther Landgraf, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1434 days.

(21) Appl. No.: 11/950,970

(22) Filed: Dec. 5, 2007

(65) Prior Publication Data

US 2008/0147209 A1    Jun. 19, 2008

(30) Foreign Application Priority Data

Dec. 15, 2006  (DE) .......................... 10 2006 059 430

(51) Int. Cl.
| | |
|---|---|
| G05B 11/01 | (2006.01) |
| G05B 13/02 | (2006.01) |
| G06F 17/50 | (2006.01) |
| G05B 17/02 | (2006.01) |

(52) U.S. Cl.
CPC ...................................... *G05B 17/02* (2013.01)
USPC .................... 700/29; 700/19; 700/108; 703/1

(58) Field of Classification Search
USPC ............. 703/1–3, 13; 700/19, 27, 28–29, 108
See application file for complete search history.

(56) References Cited

U.S. PATENT DOCUMENTS

| | | | | |
|---|---|---|---|---|
| 6,209,119 | B1 * | 3/2001 | Fukui ................................ | 716/2 |
| 6,212,438 | B1 | 4/2001 | Reine | |
| 6,556,950 | B1 * | 4/2003 | Schwenke et al. ............ | 702/183 |
| 6,853,920 | B2 | 2/2005 | Hsiung et al. | |
| 6,865,509 | B1 | 3/2005 | Hsiung et al. | |
| 6,917,845 | B2 | 7/2005 | Hsiung et al. | |
| 7,209,800 | B2 * | 4/2007 | Monz et al. .................... | 700/184 |
| 7,480,640 | B1 * | 1/2009 | Elad et al. ........................ | 706/14 |
| 2003/0139916 | A1 * | 7/2003 | Choe et al. ...................... | 703/10 |
| 2003/0174147 | A1 * | 9/2003 | Jaffe .............................. | 345/633 |
| 2004/0006420 | A1 * | 1/2004 | Yasui et al. .................... | 701/110 |
| 2004/0073475 | A1 * | 4/2004 | Tupper ............................ | 705/10 |
| 2004/0168680 | A1 * | 9/2004 | Ishiguro et al. .......... | 123/568.21 |
| 2005/0033466 | A1 * | 2/2005 | Eryurek et al. ............... | 700/108 |
| 2005/0090929 | A1 * | 4/2005 | Dolansky et al. ............. | 700/169 |
| 2005/0097194 | A1 * | 5/2005 | Eisenbeis et al. ............. | 709/221 |
| 2005/0172218 | A1 * | 8/2005 | Nishimura et al. ........... | 715/512 |
| 2005/0221514 | A1 * | 10/2005 | Pasadyn et al. ................. | 438/14 |

(Continued)

FOREIGN PATENT DOCUMENTS

| | | |
|---|---|---|
| DE | 198 41 165 | 3/2000 |
| DE | 601 13 073 | 8/2006 |
| EP | 0 875 808 | 11/1998 |
| WO | 93/25953 | 12/1993 |

OTHER PUBLICATIONS

Boros, Boolean regression, Annals of Operations Research, 1995.*

*Primary Examiner* — Darrin Dunn
(74) *Attorney, Agent, or Firm* — Michael J. Striker

(57) ABSTRACT

An automation system for creating and adapting a machine or system model, and for checking a control program of an open-loop control based on a virtual machine or a virtual system has a control system, a data recording unit for recording machine or system data, a data preparation unit for analyzing the data recorded in the data recording unit, and the parameters of the machine or system model that were ascertained via the data analysis are storable, in an automated manner, in the virtual machine or the virtual system, in order to simulate a machine or system behavior of a real machine or system.

31 Claims, 12 Drawing Sheets

(56) References Cited

U.S. PATENT DOCUMENTS

2006/0095853 A1* 5/2006 Amyot et al. ............... 715/744
2006/0224534 A1* 10/2006 Hartman et al. ............ 706/15
2007/0061037 A1* 3/2007 Grossmann et al. ......... 700/182
2007/0192078 A1* 8/2007 Nasle et al. ................. 703/14
2008/0289875 A1* 11/2008 Burge et al. ................ 175/40
2009/0271012 A1* 10/2009 Kopka et al. ............... 700/83

* cited by examiner

STATE CHANGES TO ES1:

| ES1 | 0→1 | 1 | 2 | 3 | 1→0 | 1 | 2 | 3 |
|---|---|---|---|---|---|---|---|---|
| ES2 | 0 | 1 | 0 | 0 | 0 | 0 | 0 | 0 |
| OUTPUT SIGNAL RECORDING | AS_ES1= 0→1 ES2=0 | | | | AS_ES1= 1→0 ES2=1 | | | |

STATE CHANGES TO ES2:

| ES2 | 0→1 | 1 | 0→2 | 2 | 0→3 | 3 | 1→2 | 2 | 1→3 | 3 | 1→0 |
|---|---|---|---|---|---|---|---|---|---|---|---|
| ES1 | 0 | 1 | 0 | 1 | 0 | 1 | 1 | 0 | 1 | 0 | 1 |
| OUTPUT SIGNAL RECORDING | AS_ES2= 0→1 ES1=1 | | AS_ES2= 0→2 ES1=1 | | | | AS_ES2= 1→2 ES1=1 | | AS_ES2= 2→3 ES1=1 | | AS_ES2= 1→0 ES1=0 |

| ES2 | 3→2 | 2 | 3→1 | 1 | 3→0 | 0 |
|---|---|---|---|---|---|---|
| ES1 | 0 | 1 | 0 | 1 | 0 | 1 |
| OUTPUT SIGNAL RECORDING | AS_ES2= 3→1 ES1=1 | | | | | |

FIG.8

AUTOMATED CREATION AND ADAPTION OF A MACHINE OR SYSTEM MODEL

CROSS-REFERENCE TO A RELATED APPLICATION

The invention described and claimed hereinbelow is also described in German Patent Application DE 10 2006 059 430.4 filed on Dec. 15, 2006. This German Patent Application, whose subject matter is incorporated here by reference, provides the basis for a claim of priority of invention under 35 U.S.C. 119(a)-(d).

BACKGROUND OF THE INVENTION

The present invention relates to an automation system for creating and adapting a machine or system model that is used to check control programs of an open-loop control using a virtual machine or a virtual system. The present invention also relates to a method for simulating the machine or system that is controlled by the control program.

It is known in the related art to emulate machines and systems using machine/system models and a software program, in order to simulate the machine or system.

Complicated measurements and analyses must be carried out in order to transfer the behavior of the machine or system and its peripherals to a machine/system model. The tools used are, e.g., an SPC, NC, or drive oscilloscope. Individual measurements may be carried out on a machine using these tools. Using the data that are obtained, it is possible to model individual components, e.g., a hydraulic pump. To do this, the related mathematical model must be selected from the library (if available), or the related mathematical model must be created using mathematical functions (if a library is unavailable). The mathematical model of a component must also be adapted using parameters (coefficients of the applicable function) in a manner such that it corresponds as closely as possible to the component that exists in reality. For example, the delay time between the input signal and the output signal must be measured on the machine and specified as a parameter to the mathematical model.

Using these models—which have been created in a complex manner—control programs such as NC and SPC programs may be tested without using a real machine. It is therefore possible to check the control software for a machine under diverse application conditions. This procedure shortens the start-up time of a machine or system considerably.

This adaption of machine models, e.g., for behavioral simulation, is often not accurate enough compared with the real machine to be simulated. A great deal of effort is then required to improve the machine model. This results in long development times and high development costs.

A user who only has access to elementary functions requires approximately 2 man-months to create a new machine model for behavioral simulation. This estimate applies for nearly all users who are creating a machine model for the first time and are unable to access a comprehensive component library.

More specifically, the user must create his machine model for every individual component by hand. In the field of behavioral simulation, for example, this means that the user creates the behavior of the individual components using elementary functions (e.g., adders, subtractors, time elements or polynomials of the nth degree, to name but a few) and ascertains the related parameters and/or coefficients on the real machine (parameter identification), and then transfers them to the virtual component. In this manner, the overall behavior of the machine or system is emulated.

SUMMARY OF THE INVENTION

The object of the present invention is to provide a method for creating a new machine model in a short period of time, the machine model being very close to reality, and for adapting an existing machine model to a real machine very quickly and easily.

In keeping with these objects and with others which will become apparent hereinafter, one feature of the present invention resides, briefly stated, in an automation system for performing a process selected from the group consisting of creating, adapting, and both of a unit selected from the group consisting of a machine, a system model of a virtual machine, and a virtual system for behavior stimulation, comprising a control system with a data recording unit for recording data selected from the group consisting of machine data and system data; a data preparation unit for analyzing the data recorded in said data recording unit, so as to automatically store models selected from the group consisting of machine models, system models, and both ascertained or adapted via a data analysis in the virtual machine or the virtual system in order to simulate a machine or system behavior of a real machine or system.

Another feature of the present invention resides, briefly stated, in a method of simulating a unit selected from the group consisting of a machine and a system that is controlled using a control program and an automation system, the method comprising the steps of recording data by a data recording unit of the automation system; analyzing the data recorded by the data recording unit in a data preparation unit and the generating functions; and performing a process selected from the group consisting of emulating, adapting and both of a machine or system module using the functions by incorporating function values in the machine or system model in an automated manner.

Via the inventive automated recording of highly diverse data in highly diverse time domains of the open-loop control, complex measurements are eliminated, as are complex calculations, e.g., to average the measured values that were recorded. The inventive system may be used in cases where machines and systems are emulated for simulation purposes. The system is also suited for emulating the behavior of a machine peripheral, e.g., to check a control program, such as an SPC program, in advance, i.e., before a real machine is started up. The inventive system is also suited for simulating dynamics and processes.

Using the inventive system, it is possible to exactly adapt machine models to real machines, for behavioral simulation in particular. Very little time is required to create the machine model. The present invention also eliminates the need to perform complex measurements, which must be subsequently incorporated in the machine model by hand.

Given that the parameters of the machine and system model ascertained via the data analysis are automatically storable in the virtual machine or the virtual system, in order to simulate a machine or system behavior of a real machine and system, it is possible to calculate a mean value for a period of time, e.g., from the time when a hydraulic pump is switched on—by setting an output signal—until the response "pressure has developed" (when an input signal is set) is received. Complicated measurements (e.g., n measurements to calculate the mean), which otherwise must be performed manually, may be eliminated.

The inventive system makes it possible to easily emulate a machine model or a behavioral model for various processes performed by a machine. The individual processes are preferably emulated using simple functions, e.g., a timer function. The values for these functions are registered and incorporated in the machine model in an automated manner.

By recording data—control data in particular—over a long period of time, it is possible to select necessary measurement points and apply them in mathematical methods. For example, the mean of $\Delta t$ values may be calculated, or coefficients and curves—in particular, polynomials of the nth degree—may be determined using recorded points. These long-term data recordings may be obtained, e.g., during operation of comparable machines (e.g., older machines or prototypes). For recording, it is sufficient when a PC or adequate memory is available for storing the quantity of data that is obtained.

In this manner, a user of the system obtains parameters of the relevant processes in a short period of time. The inventive system easily delivers well-founded statements regarding periods of time, the process, and loads on the machine, the tools, and the tool members. The improved statements are implemented, due to the increased accuracy of the data acquisition for longer periods of time, and due to the data preparation, which includes deviations from a mean.

In an advantageous refinement of the inventive automation system, it is provided that the control system includes a stored-program control. An SPC is very well-suited for controlling machines in the industrial sector. Using the inventive automation system, a program for a stored-program control may be tested without the need to connect a real machine to the stored-program control. Advantageously, the control system also includes an NC control, or a motion or robot control. Using an NC control, machines may be controlled in a known manner, this control being taken into account in the machine model.

Given that a PC is also connected to the control system, large quantities of data may be stored and processed for longer periods of time. A relatively large number of measurements and, in particular, measurements over long periods of time, may therefore be carried out, which are then analyzed using suitable evaluation programs. By using a PC or a related storage medium, these analyses may be implemented in a cost-effective manner, it being necessary for the PC or storage medium to be connected only while the measurement data are being recorded. Subsequently, based on a long-term recording (with sufficient resolution) of control data (NC, SPS, PC, drive . . . ) and using intelligent algorithms, which are described in detail below, the model or behavior of the individual components is ascertained in an automated manner and then loaded into the related simulation environment. As an option, recordings could also be carried out on drives and/or field bus devices which may be present, the recordings then being combined on a PC or in a suitable storage medium.

The control system is advantageously provided with a drive bus. The drive bus, which may be connected with a machine or a system, may be used with a virtual machine for simulating behavior or dynamics, on a virtual machine and on a real machine. When the inventive control system includes a field bus, which is connectable with the machine or system, and which is connectable with at least one input and output module (I/O) of the machine or system, standardized protocols may be advantageously used. Field busses have been used for a long time, and they have proven effective in practice.

According to the present invention, a method for creating—in an automated manner—a model of a machine or a system that is controlled by one or more control programs is provided with an automation system. Data recorded by a data recording unit are analyzed in a data recording unit, and functions—including the associated parameters—are generated. The machine or system model is emulated for the individual components using mathematical functions by incorporating the functions and their parameters in the machine and system model in an automated manner. A "function" is understood to mean every rule of assignment that assigns a certain output value to a certain input value.

The data preparation unit may be realized directly either on the control PC or a separate PC, the separate PC (server) being accessible directly via a network connection or via an Internet connection. The preparation of data for creating and adapting machine/component models may be offered as a service from one central location via the Internet. The advantage of this is that the modeling software would always be up-to-date.

Instead of mathematical functions, a cutting function (cutter) is also feasible, i.e., any time an input signal is changed, the associated output signal (the changes, in particular) is cut out of an available measurement.

In other words, this cutting function (cutter) ascertains—from an available measurement and in the machine model generation and adaption unit, for every input signal combination that was recorded—the associated output value, including the time delay when Boolean functions are involved, and the associated output signal sequence, including the time delay when non-Boolean functions are involved.

The output values and output signal sequences ascertained in this manner are then output—preferably in a time-synchronous manner—within the solver (the cyclic part of a virtual machine, for processing the machine model) as a function of the input signals.

Given that recording takes place in an automated manner, a virtual machine may be tailored very closely to a real machine. The inventive, automated method of recording makes it much easier to create a machine model. The present invention greatly shortens development times and reduces development costs. Preferably, it is also possible to simulate any functions that are not depicted in the data. This is explained in greater detail with reference to the figures.

In an advantageous refinement of the inventive method, it is provided that the function values are values of elementary functions. In practical application, the individual components of a machine, e.g., a machine tool, are stored largely as delayed Boolean functions for the behavioral model. It is highly favorable when all possible state changes to the input signals and the associated changes to the output signals—including the associated time delay ($\Delta t$ values)—are registered. In addition, by calculating a mean, it is possible to formulate more reliable statements regarding the function description. With Boolean functions, the time delay is recorded, in particular, in addition to the new value of the output signal. By calculating the mean, external influences, e.g., temperature fluctuations or other fluctuations resulting from environmental influences, may be taken into account.

More complex functions may be advantageously taken into account by the fact that function values are coefficients of curves, in particular polynomials of the nth degree. Using polynomials of this type, a machine model may be created that is very close to reality.

In an advantageous refinement of the present invention, it is provided that repetitive measurement points and/or signal sequences are automatically detected and taken into account when calculating a mean. Using these repetitive measurement points, a typical system behavior or a typical machine behavior may be described exactly.

Data may be transferred between the control system, the data preparation unit, the real machine, and/or the virtual machine or the system in various manners.

For example, data may be transferred using the drag & drop technique. Using the drag & drop technique to transfer data makes it easier to create and adapt a machine model. For example, a real machine and an inventive data preparation unit need not be located in the same room. It is therefore possible to create a machine model easily and conveniently. As an alternative, data may also be transferred between the control system, the data preparation unit, the real machine, and/or the virtual machine or the system using import/export functions, in XML format in particular. Since a format of this type has proven very effective in practical application, the data transfer is reliable.

A further possibility for exchanging data is to transfer the data automatically when a recording has ended, from a real or virtual control system to the data prepartion unit (e.g., via the Internet), where it is prepared, and then transferred (using a unique identifier) automatically (e.g., via the Internet) as an optimized machine model to the virtual machine. The machine model could even be transferred to the virtual machine (solver) during the on-going simulation operation.

In addition, a distinction may be made between a complete transfer of the machine model and a partial transfer. A partial transfer makes sense with a model adaption in particular when only individual parameters or data sequences have changed between the machine model transferred most recently to the virtual machine and the newly determined machine model.

According to an inventive variant of the inventive method, Boolean functions are used to ascertain the machine or system model. Using Boolean data that correspond to input or output signals and that are stored in a table, Boolean functions may be ascertained relatively easily. Boolean functions may be implemented very easily using a computer. A machine model is greatly simplified as a result, and a nearly realistic simulation is made possible.

As an alternative, instead of Boolean functions, a cutter may be used (as described above), which cuts the associated output signal out of a long-term recording in the data preparation unit for all input signal combinations that occur, with consideration for the time delay.

In combination with the peripherals of machine tools, such as a hydraulic system, it is particularly favorable when the time delay values are stored in a table in addition to the changes that occurred to the inputs and outputs. This simplifies data analysis.

As an alternative or in addition thereto, non-Boolean data that are provided to create the machine or system model may also be used. Non-Boolean data are typically functions that include several levels. Various level values may exist for one hydraulic pump, for example. In this case as well, as an alternative (as described above), instead of the exact function determination (e.g., a polynomial of the $3^{rd}$ degree) and the associated parameter identification, a cutter may be used, which cuts out the particular output sequence for the existing input signal combinations; they are then output once more in the solver when the particular combination of input signals occurs (player).

In an advantageous refinement of the inventive method, it is also provided that data from a real control system are recorded, the real control system being connected to the real machine. In addition, data from a second real control system or virtual control system are recorded, the second real control system being connected to the virtual machine or virtual system. The data from the virtual machine are compared with the data from the real machine, and the machine or system model is optimized based on the data comparison. An optimized machine or system model is therefore made available.

When several measurements are used, the signal curves and the associated points in a calculation of the mean may also be discarded in order to attain the most realistic adaption of the related components to the real components that is possible.

Optionally, after an optimal output signal sequence is ascertained using mathematical tools, the related function and its parameters are identified in the machine model generation unit. The same applies for the machine model adaption unit, although, in contrast to the machine model generation unit, the function identification may be eliminated, since the particular component model is already available there.

The present invention is directed to a method for creating and/or adapting a machine or system model of a virtual machine or a virtual system for behavioral simulation. According to the present invention, an associated output signal frequency or an associated output value is output in a time-synchronous manner as a function of input signal combinations for a specified component of the machine or system, the output taking place within one cycle of a virtual machine for processing the machine model.

In other words, a "player" is provided in the solver of the simulation environment, with which the output signal sequences (for non-Boolean functions) and the output values (for Boolean functions) may be stored for the individual components directly as component models (as part of the machine model). The object of the player is to output the associated output signal sequence or the associated output value in a time-synchronous manner during processing and as a function of the associated input signal combinations for the particular component.

In addition to a machine model—the component models of which are composed of functions with the associated parameters—, and a machine model—the component models of which are composed exclusively of output signal sequences/output values—, other machine models are also feasible, in which a portion of the components is described using functions and associated parameters, and the other portion of the components is described using output signal sequences/output values.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 8 shows tables with signal state changes in combination with the creation of the machine model according to FIG. 6;

DESCRIPTION OF THE PREFERRED EMBODIMENTS

Figure 1:
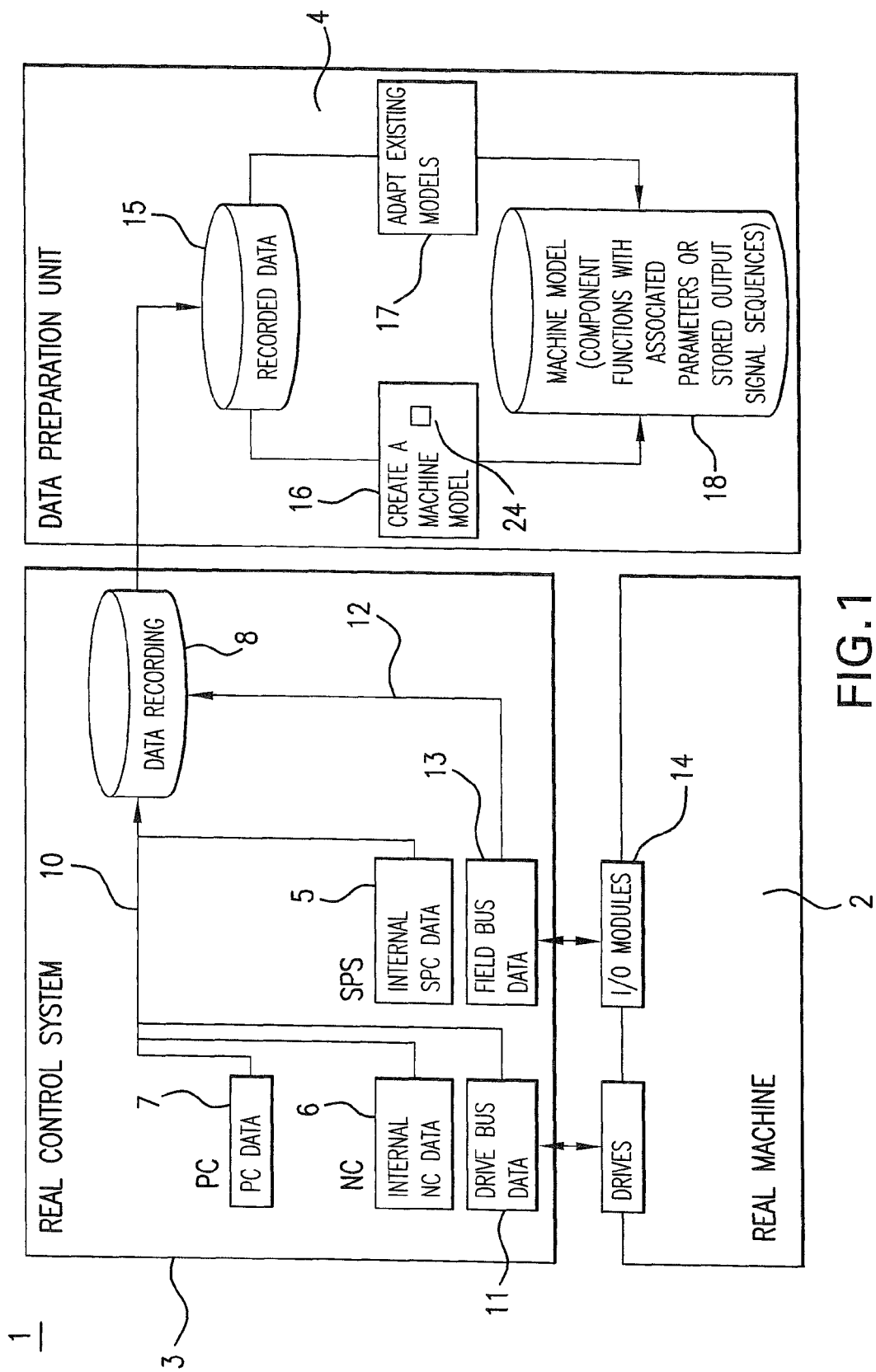
FIG. 1 shows a control system with a data recording mechanism on a real machine plus a data preparation unit.

FIG. 1 shows a preferred embodiment of inventive automation system 1. It serves to create a new machine or system model, or to adapt an existing model. As shown in FIG. 1, a real machine 2 is first connected to a real control system 3. Real control system 3 is first connected with a data preparation unit 4. Machine data may therefore be recorded.

Real control system 3 includes an SPC 5, and, optionally, an NC control 6 and, for at least a portion of time, a PC or sufficient memory 7 for long-term data recordings (data recording unit) 8. SPC 5, NC control 6 (as an alternative, a motion or robot control is used instead of an NC control), and the PC or memory 7 are connected with a common bus 10. Bus 10 is preferably designed as a drive bus, which includes an interface 11 with real machine 2.

In addition, data recording unit 8 is connected with a field bus 12. It is provided with an interface 13, which is suitable for connecting I/O modules 14 of the real machine.

SPC 5 of real control system 3 includes internal SPC data. NC control 6, which is available as an option, controls internal NC data, as is common with control systems of this type. In addition, PC 7—which is also available as an option—provides PC data to data recording unit 8.

As shown in FIG. 1, data recording unit 8 is connected to data preparation unit 4.

Data preparation unit 4 includes a data memory 15 for storing previously recorded data, and a machine model generation unit 16, and/or a machine model adaption unit 17, and a machine model memory 18. Data memory 15 contains a copy of the data that were recorded in data recording unit 8 of real control system 3. These data undergo data analysis in machine model generation unit 16 using mathematical tools. Machine model 24 is therefore created in data analysis unit 16.

As an alternative, parameter identification may be carried out using machine model adaption unit 17 for existing machine models, i.e., only one parameter identification applies, instead of the function/parameter identification, since the function is already specified by the machine/component model.

The required model data may be transferred as a complete machine model to the virtual machine when the data come from machine model generation 16, or as a partial model when the data come from machine model adaption unit 17, or when only individual parameters or data sequences have changed between the component/machine model transferred most recently to the virtual machine and the newly ascertained component/machine model.

The machine model in machine model memory 18 stored in data preparation unit 4 may be composed of component functions with the associated parameters or, as an alternative, of stored recording sequences.

Via the components shown in FIG. 1, data from a real machine may be recorded and analyzed under real environmental conditions. This recording takes place with real control system 3, so that the recordings are very close to reality (and, in particular, they exist with an adequate accuracy of recording).

FIG. 1 therefore shows a control system 1 with a data recording structure on a real machine 2 and data preparation unit 4 required therefor. Data recording unit 4 may also be located directly on the control PC or it may be realized on a server, which is reachable, e.g., via an Internet connection.

Figure 2:
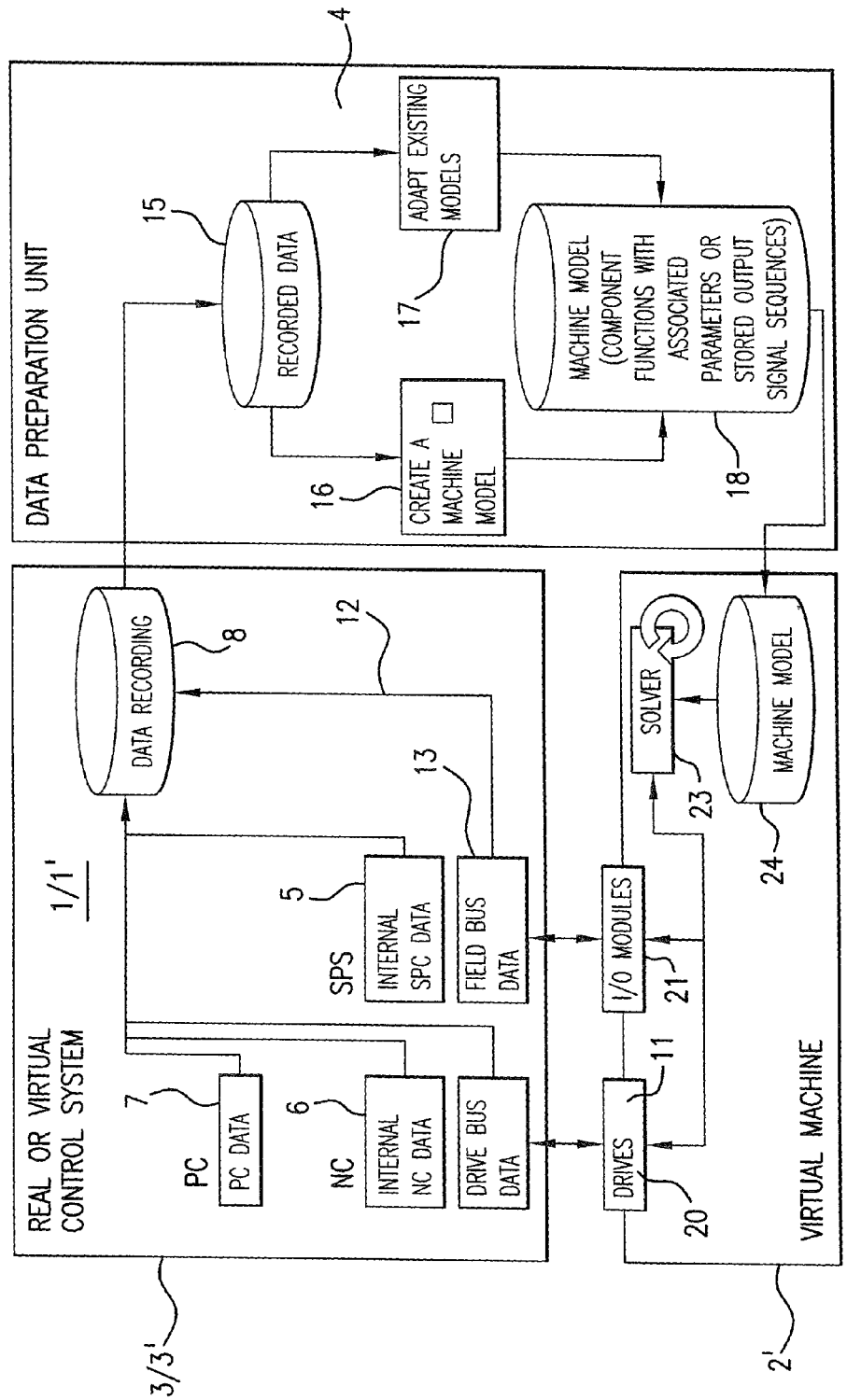
FIG. 2 shows a real or virtual control system on a virtual machine (with a machine model) plus a data preparation unit.

FIG. 2 shows a real or virtual control system, which, in a subsequent step, is connected to a virtual machine with a machine model. Control system 1 may be a real control system 1 or a virtual control system 1'. They have the same structure as control system 1 shown in FIG. 1. Control system 1 or 1' is connected with a virtual machine 2' via the real or a virtual drive bus 11 and the real or virtual field data bus 13. The machine models of data recording unit 4 are made available to the virtual machine either in the form of individual component functions with the associated parameters, or as individual signal sequences. This forms the basis of a machine model 24, as shown in FIG. 2. Machine model 24 is processed cyclically in specified cycles in a solver 23, which is connected with the real or virtual drive interface (or the virtual drive) 20, or with the real or virtual field bus interface (or the virtual I/O modules) 21. Virtual machine 2' shown is provided to simulate behavior or dynamics and/or drives or processes.

As shown in FIGS. 1 and 2, the inventive control system is provided with a data recording unit 8 for recording the machine data. System 1 includes a data preparation unit 4 for analyzing the data recorded in data recording unit 8.

According to the present invention, the parameters of machine model 24 ascertained via data analysis are stored in virtual machine 2', in order to simulate a machine behavior of a real machine 2.

This means that measured values are first recorded under real application conditions on a real control system 1. A real machine is therefore first connected to real control system 1. The recorded data are then transferred to memory 15 of the data recording unit. The measured data need not be transferred manually. Instead, they may be transferred via drag & drog, import/export functions, or automatically once the measurement has ended, as shown in FIG. 1. Complex measurements and evaluations may be eliminated as a result.

As shown in FIG. 2, the recorded data are made available to the virtual machine for processing in the solver using mathematical tools in the form of a machine model (individual component functions with the associated parameters or individual signal sequences). The transfer may take place (as described above) either as a complete machine model—when the data come from machine model generation 16—to the virtual machine, or the transfer may take place as a partial model, when the data come from machine model adaption unit 17.

As shown in FIG. 2, the real control system and the virtual control system may be tested with the virtual machine, which was obtained via the present invention. As a result of this process, the virtual machine deviates only slightly from a real machine, since it automatically takes environmental influences—such as temperature fluctuations or the like—into account, and it simulates reactions to influences of this type.

The transfer of model data 24 from machine model memory 18 of data preparation unit 4 to the machine model memory of the virtual machine may take place via drag & drop, import/export functions, or in a fully automated manner (using a unique identifier for every individual component).

Figure 3:
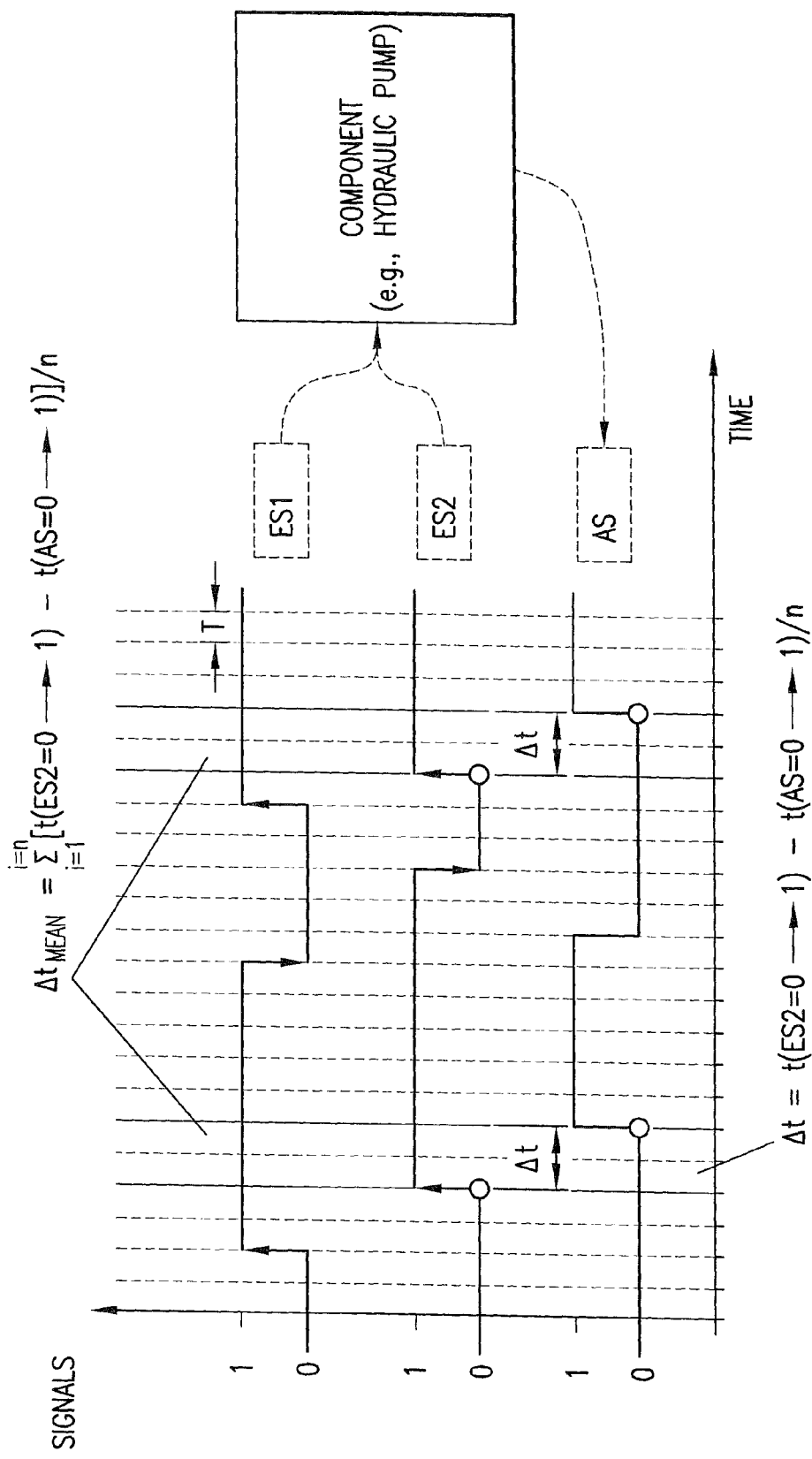
FIG. 3 shows an adaption of a machine model for Boolean functions.

FIG. 3 shows, as an example, an adaption of an existing machine model for Boolean functions using mathematical tools in machine model adaption unit 17. Reference letter T represents the recording cycle, which particularly preferably also corresponds to that of the solver (player cycle) in the virtual machine.

As shown in the pulse diagram in FIG. 3, two input signals ES 1 and ES 2 are provided, for example; they are sent to a component 30, e.g., a hydraulic pump. Signals ES 1 and ES 2 are Boolean signals with logical values 0 and 1. The component of hydraulic pump 30 delivers an output signal AS, also with Boolean values 0 and 1. There is a time delay between input signal ES 2 and output signal AS, indicated as Δt. Δt is the time between the two positive slopes of pulse ES 2 and AS. This is depicted in FIG. 3 as Δt=t (ES2=0→1)–1 (AS=0→1). Most preferably, a single value Δt is not determined, but rather a mean Δt of n measurements (or a long-term recording with n measurements). FIG. 3 therefore illustrates that function values of elementary functions are used, the elementary functions being Δt values of timer functions. Several Δt values are therefore ascertained. The Δt values are used to calculate a mean, so that a machine model may be formed that is as close to reality as possible.

Figure 4:
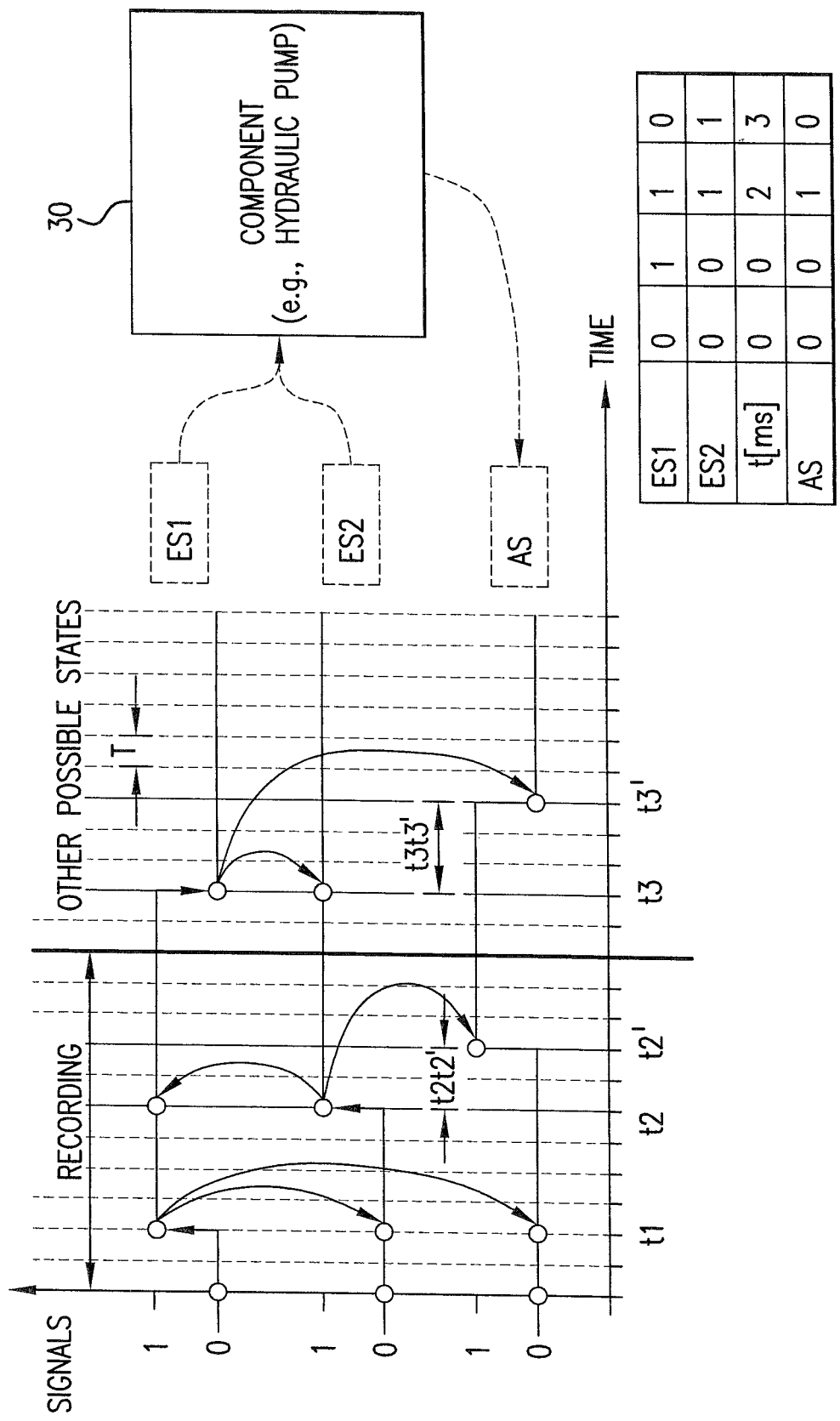
FIG. 4 shows a machine model for Boolean functions.

FIG. 4 shows an example of creating a machine model in machine model generation unit 16 for Boolean functions, also using the component "hydraulic pump" 30. Two input signals ES1 and ES2 are present, and the signals may be time-shifted. The positive slopes of signals ES1 and ES2 are labeled t1 and t2. Output signal AS is a signal with a positive slope at instant t2' and a negative slope at instant t3'. At instant t3, signal ES1 falls from logic 1 to logic 0. At instant t2, signal ES2 increases from logic 0 to logic 1. Signal AS is characterized by the fact that two Δt values are present, i.e., Δt2t2' and Δt3t3'. The first value represents a time delay between the positive slope of second signal ES2 and the positive slope of the output signal. The second value represents the time delay between the negative slope of first signal ES1 and the negative slope of the output signal. In this example, the machine model is therefore based on two time-delay values. Signal combination ES1=0 and ES2=1—which is not registered during the recording—is shown at the right in the diagram (outside of the recording on the machine) as an example, and it must be taken into consideration when creating the model.

In the table shown in FIG. 4 as an example, the second column (ES 1=1, ES 2=0, Δt=0, AS=0) corresponds to the value recorded at t1 in FIG. 4. Accordingly, the third column (ES1=1, ES2=1, Δt=2, AS=1) in the table corresponds to the measured value recorded at t2' (FIG. 4). The fourth column in the table characterizes the last remaining state that was not registered during the recording process. It was specified by the operator. In this missing state (ES 1=0, ES2=1), the missing time delay Δt was set to 3, and AS was set to state 0.

If necessary, the operator may also modify the values entered by the model generation unit in the table.

Figure 5:
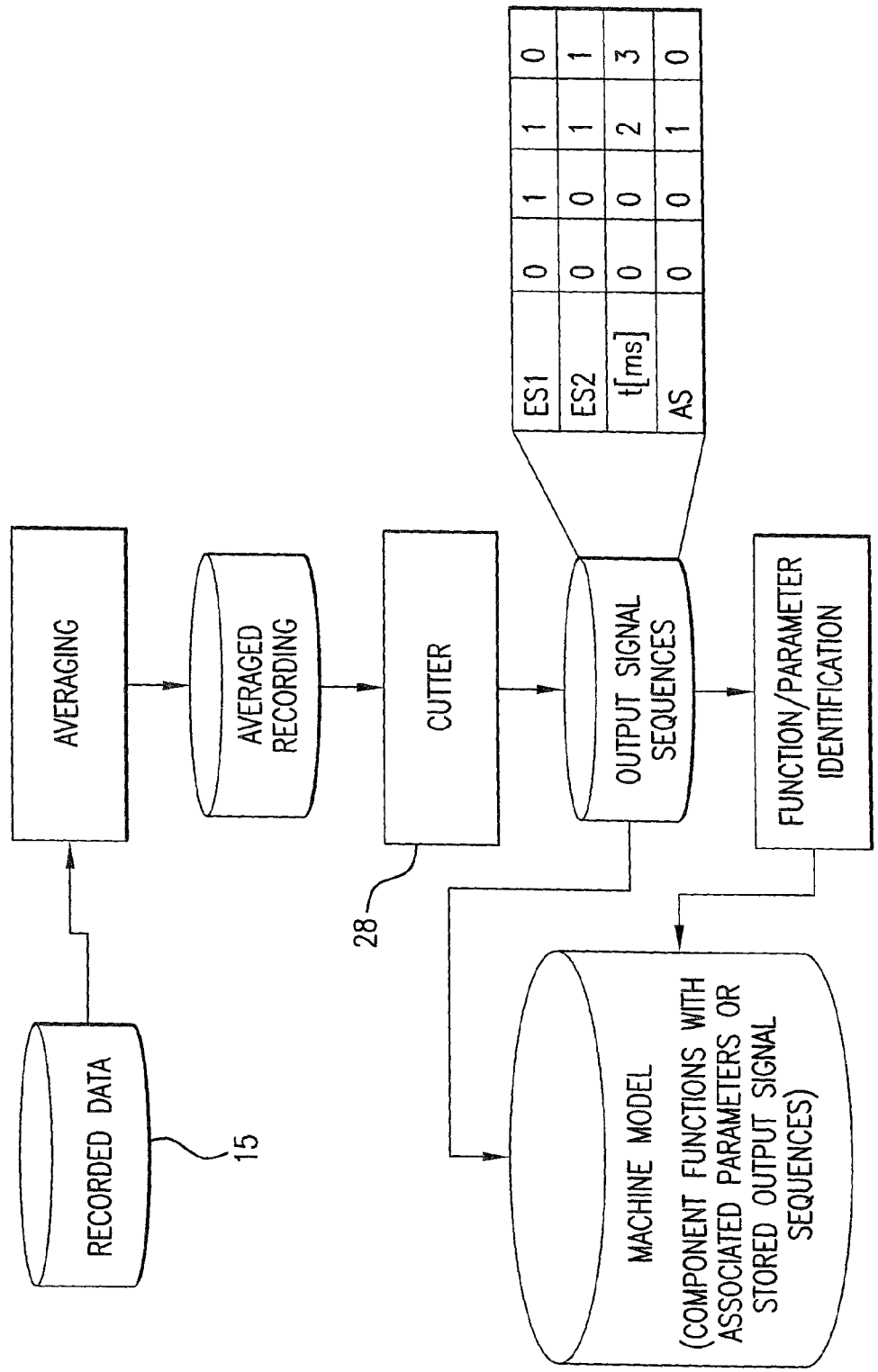
FIG. 5 shows a machine model generation unit.

FIG. 5 shows one possible embodiment of machine model generation unit 16. In a preferred embodiment of the present invention, the recorded data are first read out of data memory 15, the individual signal sequences are checked for repetition, then they are averaged and stored once more as an averaged recording.

Figure 6:
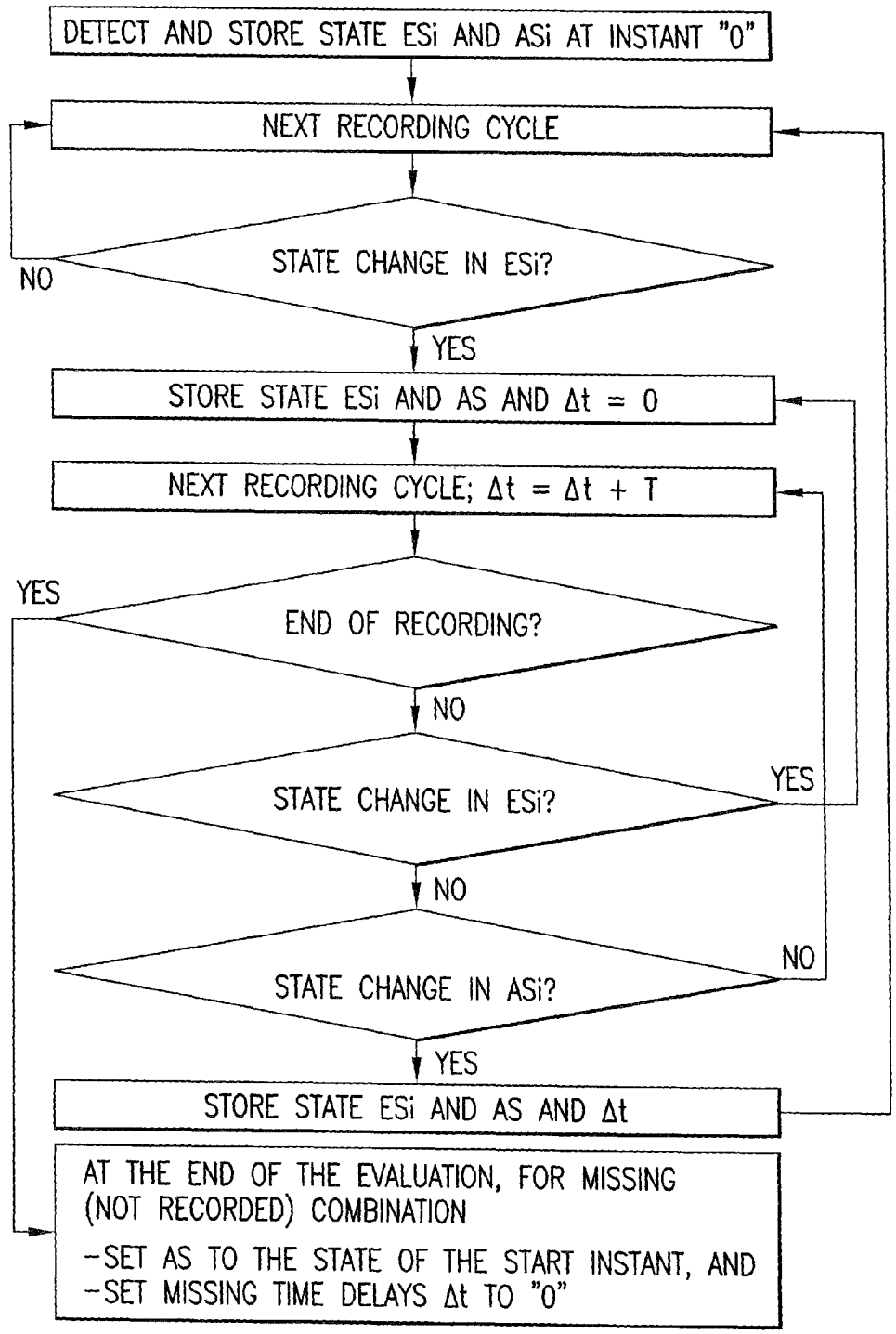
FIG. 6 shows a basic algorithm of the cutter for Boolean functions for creating a machine model.

Next, a cutter 28 (the basic algorithm is depicted in FIG. 6) runs via the optimized output signal sequences. If a "player" is included in the solver, the output signal sequences may be stored with the associated input signal combinations of a component directly as a component model (as part of the machine model). If the particular component is described with the aid of a mathematical function, the function and its parameters must also be ascertained.

The functions of averaging, cutter, and function/parameter identification may also take place in a different order. It would also be feasible for a cutter to initially ascertain output signal sequences, for them to then be averaged, and, finally, for the function/parameters to be identified. The averaging could also be the last unit, with the parameter values being averaged.

Machine model adaption unit 17 has essentially the same design as that shown in FIG. 5. Instead of the function/parameter identification, only parameter identification takes place, since the function is already specified by the machine/component model.

A basic algorithm of the cutter for Boolean functions for creating a machine model is shown in FIG. 6. Boolean functions of a component, e.g., a hydraulic pump, include, e.g., a time delay.

Input signals ESi {i·(1, 2, 3, . . . )} and output signals ASi {i·(1, 2, 3, . . . )} are registered at the start instant. Next, essential state changes of the output signals are registered as a function of the changes made to the input signals, and the associated time delay Δt is incorporated, e.g., in a table (see FIG. 4 and FIG. 5).

Based on the Boolean data and/or the relationship between input signals and output signals, the associated Boolean functions may be easily ascertained in the function area of function/parameter identification of the data recording unit. Any time delay values that are present are also ascertained.

Based on the table that is created (see FIG. 4 and FIG. 5), and the information regarding missing (not recorded) combinations that must also be entered or specified, the associated Boolean function—including the delay time of the related component for the machine model—may be created.

A similar algorithm is also possible with non-Boolean functions, while taking time delays into account. In this case as well, the state of the input signals and the output signals at start instant 0 are registered and stored in the cutter. If a state change to one of the input signals occurs in this case, however, the cutter takes the output signals ASi continually, and not just a single value, as is the case with Boolean functions. As soon as another state change takes place at one of the input signals $ES_i$, the cutter stores the recorded data with the associated descriptor.

In this case as well, the state of the start instant is set at the end of the evaluation for missing (not recorded) combinations of output signals ASi.

The operator defines "missing combinations" in this case as well. The operator also has the option of modifying existing records.

The recorded data may be optimized by eliminating repetitive data. As an alternative to a direct output of the recorded (and, possibly, optimized) output signals in the solver of the virtual machine/system, the associated functions (e.g., the degree of a related polynomial function and the associated coefficients of the polynomial) may be ascertained for the recorded signal data (as described above for Boolean functions, see FIG. 5), if this is more favorable for processing (solver).

Figure 7:
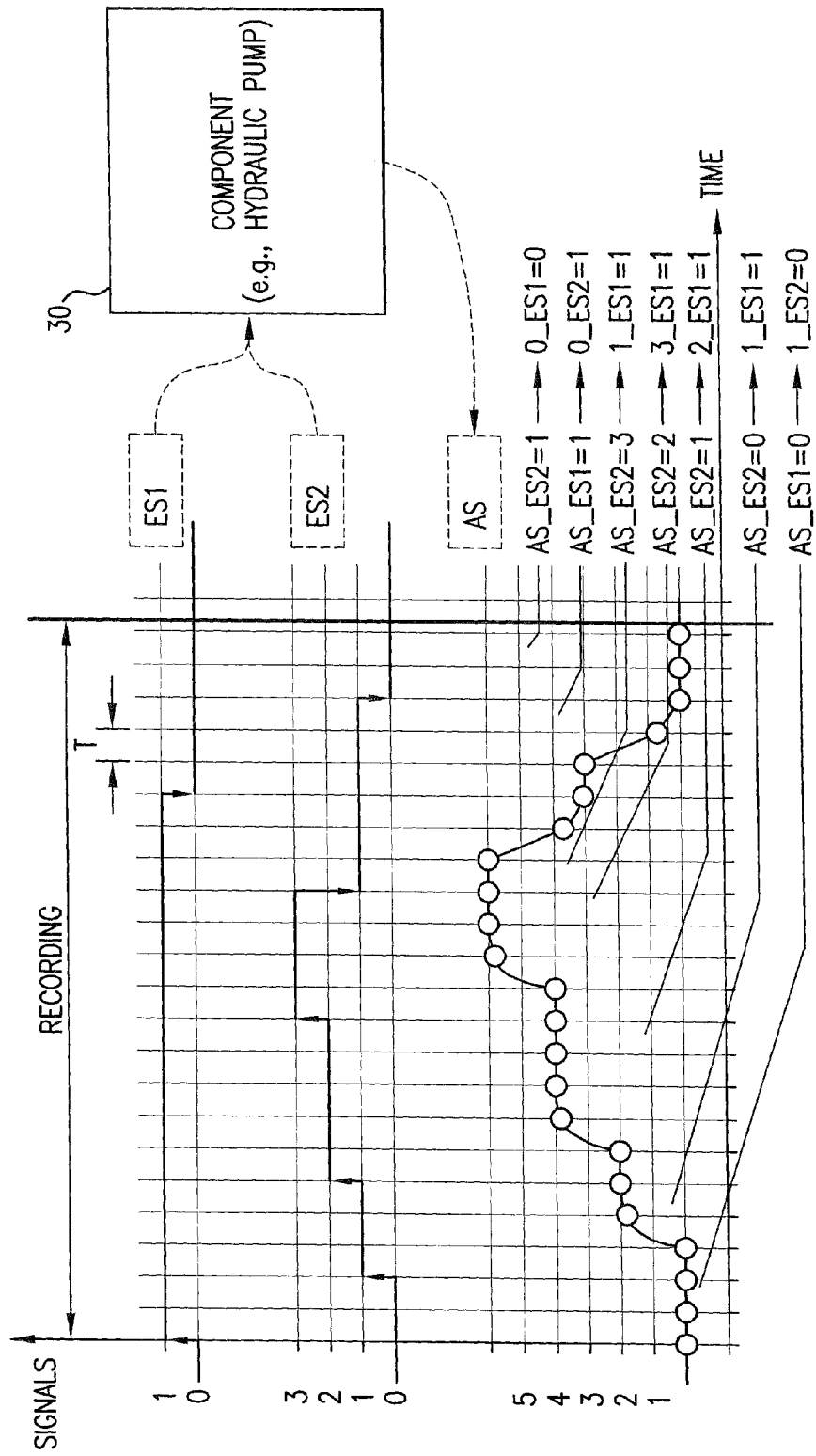
FIG. 7 shows the creation of a machine model for non-Boolean functions.

The creation of a machine model for components with non-Boolean functions (e.g., a hydraulic pump) is described in greater detail in FIG. 7. The naming of the recording sequences of the output signals depending on the change made to an input signal is depicted in the lower right-hand corner of FIG. 7 (AS_ES1=0→1_ES2=0, etc.)

In a preferred embodiment, the recorded data are read out of data memory 15, checked for repetition, averaged, sent to a cutter (the basic algorithm is depicted in FIG. 6), and function/parameter identification is then carried out as an option.

The functions of averaging, cutter, and function/parameter identification may also take place in a different order. It would also be feasible for a cutter to initially ascertain output signal sequences, for them to then be averaged, and, finally, for the function/parameters to be identified. The averaging could also be the last unit, with the parameter values being averaged.

Figure 9:
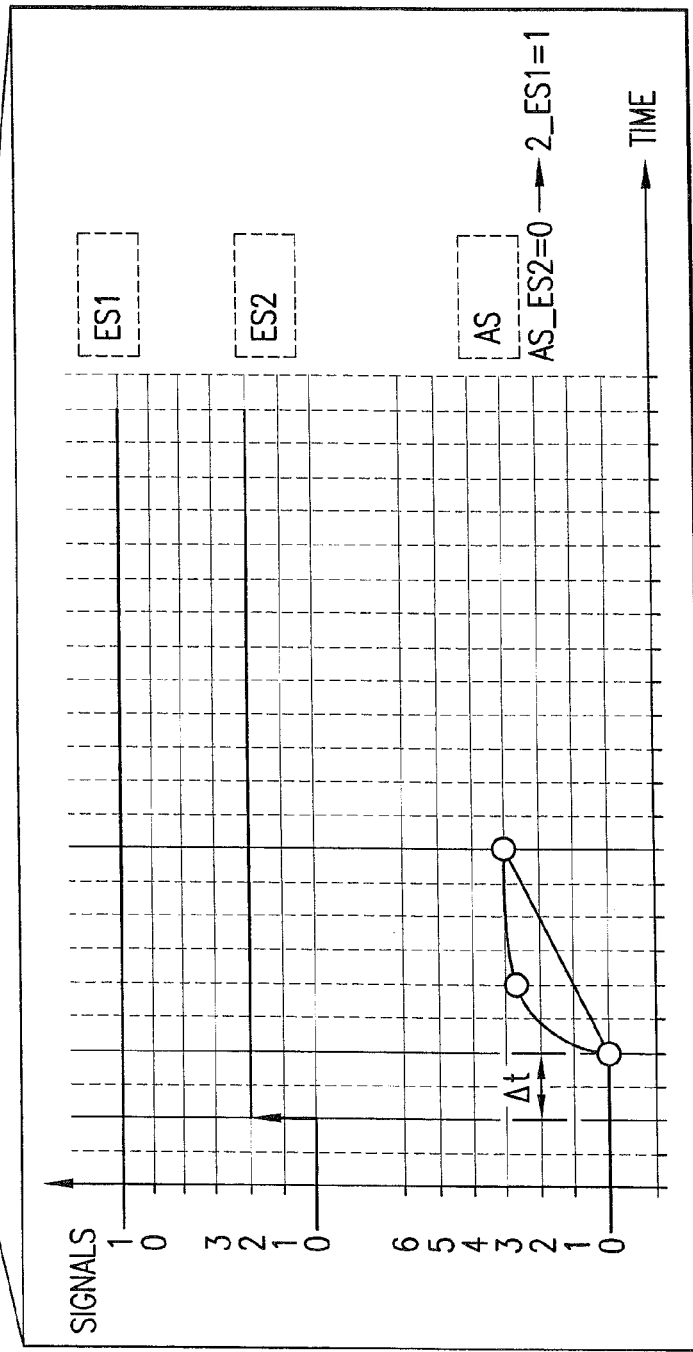
FIG. 9 shows a subsequent definition of individual signal curves for missing states and for modifying previously recorded signal curves.

FIG. 7 explains, as an example and with reference to FIG. 8 and FIG. 9, the creation of the machine model and the algorithm for machine components with non-Boolean functions, e.g., a hydraulic pump. Once the signals are averaged (see above), the cutter registers output signal AS as a function of input signals ES 1 and ES 2, as shown in the tables (FIG. 8). In the first table, the state changes to first signal ES 1 are registered. State changes to second input signal ES 2 are registered in the lower table (shown as two tables, due to space limitations) in FIG. 8.

FIG. 7 illustrates another possibility for optimizing the data generated by the cutter. In FIG. 5, an optimizer of this type could be placed at the end of the cutter. In FIG. 7, identical data points in a recording sequence are crossed out, for example—they could be deleted without affecting the recording accuracy.

As shown in FIG. 9, existing recordings may be verified by the operator and modified if necessary. In addition, any missing recordings may be defined by the operator. A curve shape 26 may be defined using individual points (filling a cutter sequence) or curves, such as an exponential function. Delays (Δt values) may also be easily taken into account.

The table shown in FIG. 9 is the same as the table shown in the middle of FIG. 8.

Figure 10:
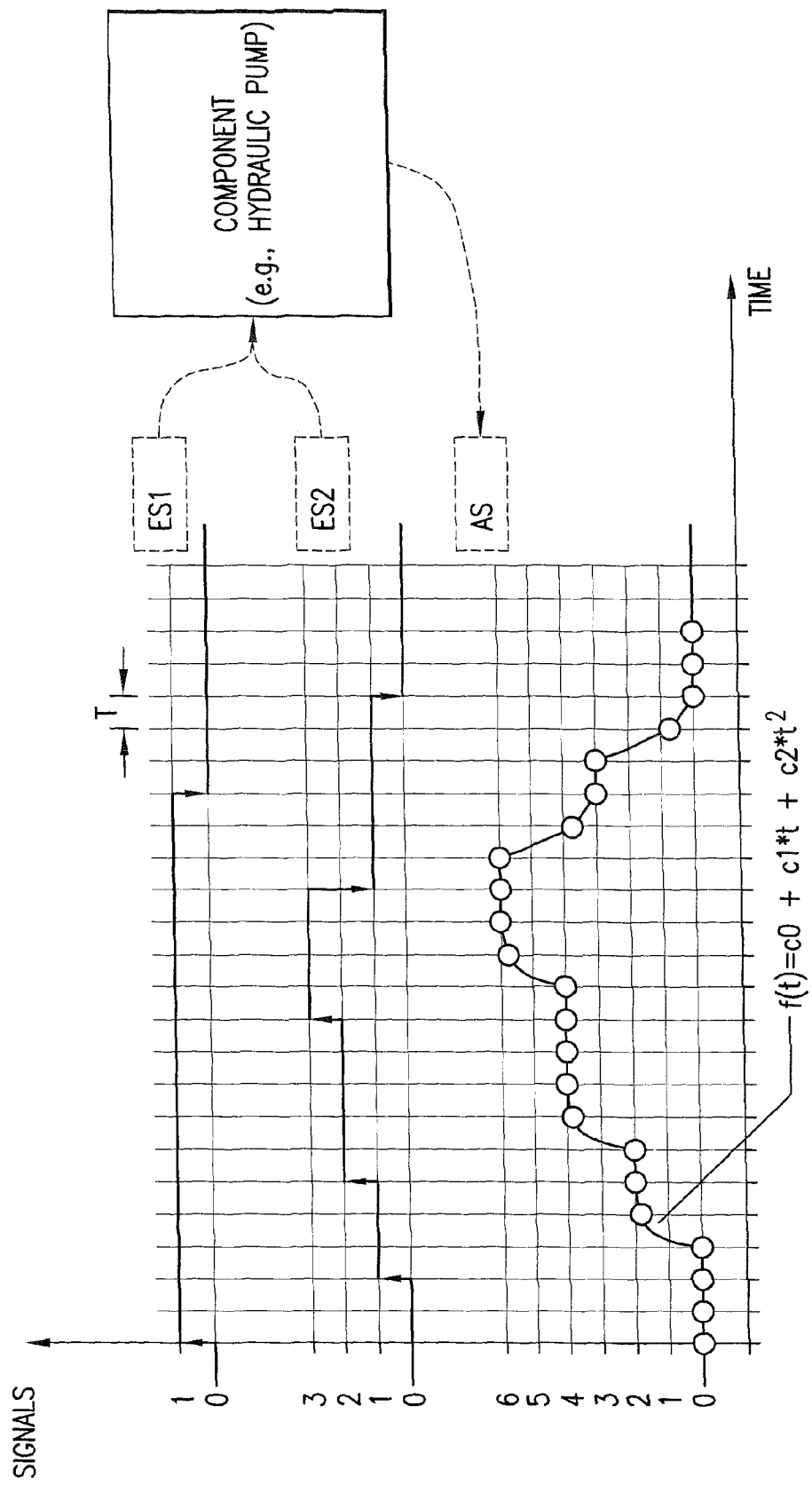
FIG. 10 shows an adaption of a machine model for non-Boolean functions.

An existing machine model and/or an existing component model may also be adapted using non-Boolean functions, as shown in FIG. 10. In the example shown here, a digital signal ES 1 and a second digital signal ES2 with several level values (1, 2, 3) are used. They may also be signals that are sent to a hydraulic pump. Output signal AS, shown at the bottom of FIG. 10, also has several level values (1 through 5).

In the procedure carried out in the machine model adaption unit—similar to the machine model generation unit shown in FIG. 5—parameter identification (without function identification in this case, because the related functions have already been specified) is carried out in the last function unit. In the example shown, a second-degree polynomial (the function $f(t)=c0+c1 \times t+c2 \times t^2$) is used. Coefficients c0, c1 and c2 must be determined.

In the same manner as described above, it must also be possible in this case to store recordings of the outputs for further states of the input signals that did not occur, and to use other, previously recorded output sequences that resulted in other comparable transitions. For example, a non-recorded transition from level value 1 to level value 3 of input signal ES2 (at ES1=1) could be approximated using a previously-determined transition, e.g., the transition from level value 1 to level value 2.

Figure 11:
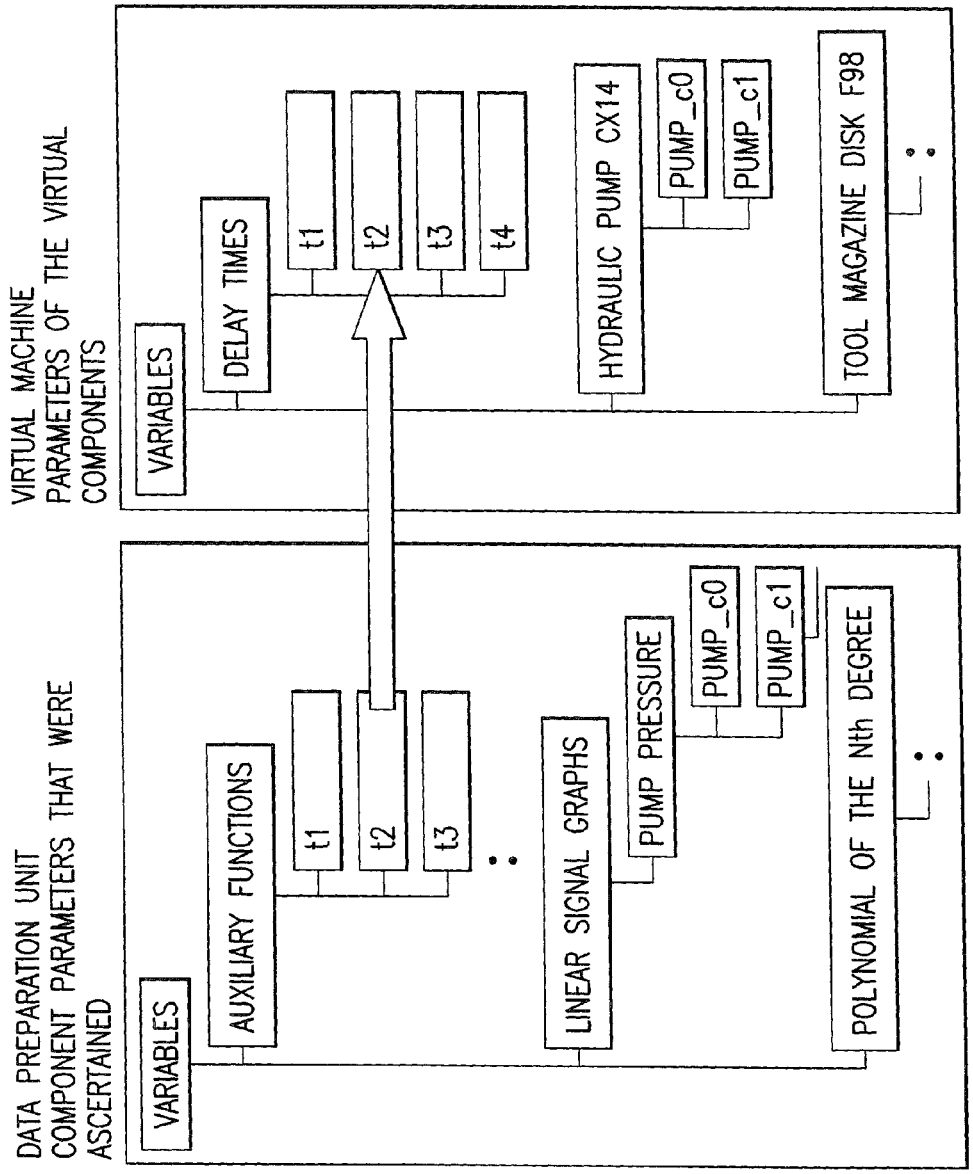
FIG. 11 shows a schematic depiction of the transfer of data that were ascertained into the machine model.

FIG. 11 shows, as an example, the incorporation of the data that were ascertained into the machine model of the virtual machine. The characteristics of the components in data preparation module 4 are shown at the left in FIG. 11. Typical parameters are the execution times of auxiliary functions (Δt1, Δt2 and Δt3) or, e.g., the graph of a pump pressure in the form of a polynomial of the nth degree.

These parameters and the function of a virtual component, e.g., an exponential function of a virtual hydraulic pump with the associated coefficients, are transferred to the virtual machine, where they are processed in cycles. In this manner, a behavior simulation of the machine or system is attained.

As an alternative to the drag & drop technique using trees, it is also possible to exchange data (as described above) between the virtual machine and the data preparation unit using import/export functions—which preferably take place in XML format—or automatically at the end of a creation or adaption process based on the component IDs (typically the unique name).

Figure 12:
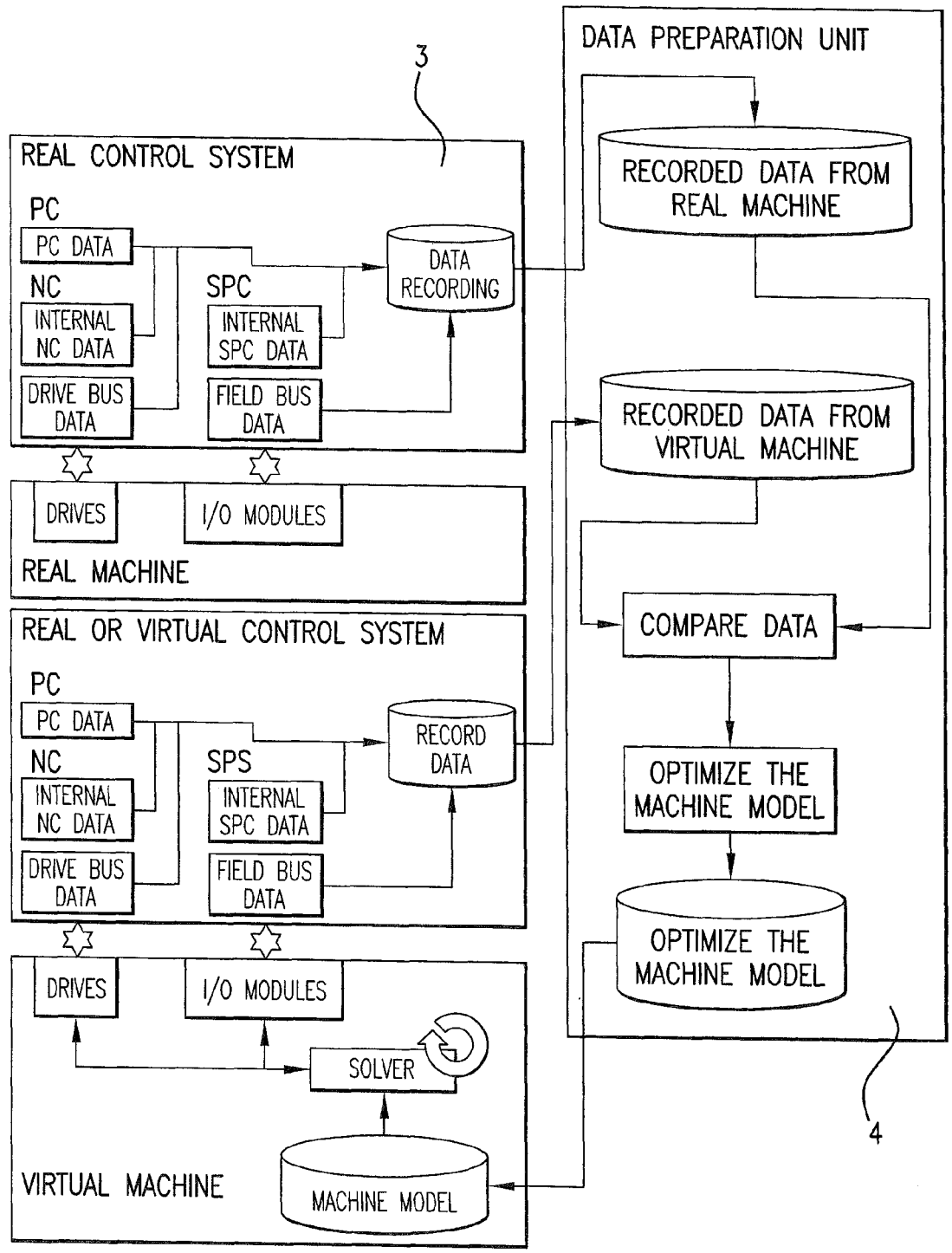
FIG. 12 shows a schematic depiction of the checking of the machine model.

A check of the virtual machine model may be carried out using a real machine, as shown in FIG. 12. Data preparation unit 4 shown in FIG. 12 receives recorded data from the real machine and from the virtual machine that is used. The data are compared and optimized in order to optimize the machine model for every individual component. This may take place as described above by fitting the individual functions, including the associated coefficients, or by fitting the recorded output data sequences for the individual input combinations of the individual components.

The recorded output signal sequences may be optimized by eliminating repetitive data. This applies, in particular, for signal values at the end of the recording (see FIG. 7).

It is also possible to copy and modify signal graphs for non-recorded signal graphs, and to edit/modify previously ascertained data in the form of tables, it being possible to specify the functions as points or curves.

As shown in FIG. 12, with the method for checking the machine or system model and the associated component model (e.g., the hydraulic pump model), the associated input and output signals of the particular components are recorded on real control system 3 (real control system 3 being connected to the real machine), and the related data on the virtual component are recorded on the second (real or virtual) control system—the second control system being connected to a virtual machine—, and the recordings of the related components of the virtual machine are optimized, if necessary, and compared with the real machine, and the related component model is optimized based on the data comparison and is then made available in an optimized form to the virtual machine.

In addition to a machine model—the component models of which are composed of functions with the associated parameters—, and a machine model—the component models of which are composed exclusively of output signal sequences/output values—, other machine models are also feasible, in which a portion of the components is described using functions and associated parameters, and the other portion of the components is described using output signal sequences/output values.

The present invention is very well-suited for behaviorial simulation—also referred to as peripheral simulation—and for dynamic or process simulation of a machine/system. "Intelligent algorithms" may be used to ascertain the machine behavior in an automated manner.

The present invention may be used not only on machines and components, e.g., a hydraulic pump, but also on complex systems, in which case more complex functions may be used rather than elementary functions such as timer functions.

The present invention and the mechanisms described above for creating and adapting models for behavioral simulation (often referred to a peripheral simulation) may also be transferred to the area of dynamics simulation and process simulation.

All features disclosed in the application documents are claimed as being essential to the present invention, provided they are novel compared with the related art, either individually or in combination.

It will be understood that each of the elements described above, or two or more together, may also find a useful application in other types of constructions differing from the type described above.

While the invention has been illustrated and described as embodied in an automated creation and adaption of a machine or system model, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automation system for creating, adapting, or both of a system model of a machine or a virtual machine, or a virtual system for behavior simulation, said automation system comprising:
   a control system;
   a real machine connected to said control system;
   a data recording unit for recording data connected to said control system and connected to a field bus, said recording data selected from the group consisting of machine data and system data, wherein said field bus includes an interface configured to connect input/output modules of the real machine;
   a data preparation unit for analyzing the data recorded in said data recording unit, so as to automatically store in said data preparation unit parameters of the machine and system models selected from the group consisting of machine models, system models, and both validated or adapted via a data analysis in the virtual machine or the virtual system in order to simulate a machine or system behavior of a real machine or system, wherein said data preparation unit includes a data memory, a machine model memory and at least one of a machine model generation unit and a machine model adaption unit, wherein said data memory operates to store previously recorded data; and
   a cutter arranged in the data preparation unit, wherein the cutter cuts associated output signals out of a long term recording in the data preparation unit, or output sequence for all input signal combinations that occur, with consideration for a time delay;
   wherein the cutter is configured to ascertain, from an available measurement and in the machine model generation unit and the machine model adaption unit, for every input signal that was recorded, an associated output value, including a time delay when Boolean functions are involved, and an associated output sequence, including another time delay when non-Boolean functions are involved.

2. An automation system as defined in claim 1, wherein said control system includes a stored-program control.

3. An automation system as defined in claim 1, wherein said control system includes a control selected from the group consisting of a NC control, a motion control, and a robot control.

4. An automation system as defined in claim 1, wherein said control system includes an element selected from the group consisting of a PC and a sufficient memory at a point in time when the data are recorded.

5. An automation system as defined in claim 1, wherein said control system includes a SPC, an NC control, and a PC.

6. An automation system as defined in claim 1, wherein said control system includes a drive bus which is connectable with the machine or the system.

7. An automation system as defined in claim 1, wherein said data preparation unit is integrated in said control system.

8. An automation system as defined in claim 1, wherein said data preparation unit is linked via an element selected from the group consisting of a network and the Internet for communication with said control system.

9. A method as defined in claim 1; and further comprising using values of elementary functions as the function values.

10. A method as defined in claim 9; and further comprising using $\Delta t$ values of timer functions as the values of elementary functions.

11. A method as defined in claim 10; and further comprising registering several ones of the $\Delta t$ values; and calculating a mean of the $\Delta t$ values.

12. An automation system as defined in claim 1, further comprising a solver for processing cyclically in specified cycles a machine mode, wherein said solver is connected with the real or virtual drive interface or with the real or virtual field bus; and wherein the output signal sequences are represented as a model of a component and are stored with the associated input signal combinations of the component directly a component model or as a part of the machine model, respectively.

13. A method of simulating a unit selected from the group consisting of a machine and a system that is controlled using a control program and an automation system, the method comprising the steps of:
   providing a data recording unit;
   providing a data preparation unit;
   recording data by the data recording unit of the automation system;
   analyzing the data recorded by the data recording unit in the data preparation unit and generating functions;
   cutting, by cutter arranged in the data preparation unit, a segment including associated output signals out of a long term recording in the data preparation unit, or the output sequence for all input signal combinations that occur, with consideration for a time delay, wherein the cutter ascertains, from an available measurement and in a machine model generation unit and an adaption unit, for every input signal combination that was recorded, an associated output value, including a time delay when Boolean functions are involved, and an associated output signal sequence, including a time delay when non-Boolean functions are involved;
   performing automatically a process selected from the group consisting of emulating, adapting and both of a machine or system model using the functions by incorporating function values in the machine or system model; and
   simulating the unit selected from the group consisting of a machine and a system as a result of said process of emulating, adapting, or both.

14. A method as defined in claim 13; and further comprising using coefficients of curves as the function values.

15. A method as defined in claim 14; and further comprising using polynomials to an nth degree as the coefficients of curves.

16. A method as defined in claim 13; and further comprising automatically detecting elements selected from the group consisting of measurement points, signal sequences, and both; and taking them into account when calculating a mean.

17. A method as defined in claim 13; and further comprising transferring the data between a control system, the data preparation unit, a real machine, a virtual machine or system, and combinations thereof using a drag and drop technique.

18. A method as defined in claim 13; and further comprising transferring the data between a control system, the data preparation unit, a real machine, a virtual machine or system, and combinations thereof using import/export functions.

19. A method as defined in claim 18, wherein said using import/export functions includes using said import/export functions in XML format.

20. A method as defined in claim 13; and further comprising when a recording ends, automatically transferring the data from a real or virtual control system to the data preparation unit, where they are prepared; and then automatically transferring them as an optimized machine model to the virtual machine.

21. A method as defined in claim 13, for creating a machine or system model, and further comprising using Boolean data stored in a table using at least one input signal and at least one output signal; and ascertaining Boolean functions therefrom.

22. A method as defined in claim 21; and further comprising storing time delay values in the table.

23. A method as defined in claim 13, for creating a machine or system model, comprising the step of using non-Boolean data.

24. A method as defined in claim 13; and further comprising using the method for simulating dynamics or process of the machine or system.

25. A method as defined in claim 13; and further comprising incorporating intelligent algorithms for ascertaining the machine or system behavior in an automated manner.

26. A method as defined in claim 13; and further comprising providing the machine or system model composed of several component models; describing a portion of the components using functions and associated parameters; and describing another portion using output signal sequences/output values.

27. A method as defined in claim 13, for checking a machine or system model; and further comprising recording data from a real control system connected to a real machine; recording data from a second real control system or virtual control system, which second real control system or virtual control system is connected to a virtual machine or virtual system; comparing the data from the virtual machine with the data from the real machine; optimizing the machine or system model based on the data comparison; and as a result making available to the virtual machine the machine or system model that has been optimized.

28. A method as defined in claim 13; and further comprising transferring the data at least partially via the Internet.

29. A method as defined in claim 13 for performing a process selected from the group consisting of creating, adapting and both of a unit selected from the group consisting of a machine model, a system model of a virtual machine, and a virtual system for behavior simulation, comprising the following steps:

depending on input signal combinations for a specified component of the machine or system, outputting an associated output signal sequence or an associated output value in a clock-synchronous manner, said output taking place within a cyclic portion of the virtual machine for processing the machine model;

providing a first real control system;

providing a second real control system or virtual control system;

providing a real machine;

recording data from the real control system connected to the real machine;

recording data from the second real control system or virtual control system, wherein said second real control system or virtual control system is connected to a virtual machine or virtual system;

comparing the data from the virtual machine with the data from the real machine;

optimizing the machine or system model based on the data comparison; and as a result making available to the virtual machine the machine or system model that has been optimized.

30. A method as defined in claim 29; and further comprising transferring the data at least partially via the Internet.

31. A method as defined in claim 13, further comprising the steps of processing cyclically of the machine model in specified cycles via a solver; outputting the associated output signal sequence or the associated output value in a time-synchronous manner during processing and as a function of the associated input signal combinations for the associated component by the solver; and storing at least one of output signal sequences represented as a model of a component and output values for the individual components directly as component models which represent a part of the machine model.

* * * * *